(12) United States Patent
Hondulas

(10) Patent No.: US 8,382,982 B2
(45) Date of Patent: Feb. 26, 2013

(54) APPARATUS MERGING WETLAND PLANTS WITH A FLOATING SUBSTRATE TO TREAT POLLUTION IN ANY RIVER, LAKE OR BODY OF WATER

(76) Inventor: John L. Hondulas, Knoxville, TN (US)

( * ) Notice: Subject to any disclaimer, the term of this patent is extended or adjusted under 35 U.S.C. 154(b) by 446 days.

(21) Appl. No.: 12/801,352

(22) Filed: Jun. 4, 2010

(65) Prior Publication Data

US 2011/0297596 A1    Dec. 8, 2011

(51) Int. Cl.
*C02F 3/32* (2006.01)
(52) U.S. Cl. .................. 210/602; 210/170.05; 210/242.1
(58) Field of Classification Search .................. 210/602, 210/615, 616, 617, 170.01, 170.03, 170.05, 210/170.09, 170.1, 242.1
See application file for complete search history.

(56) References Cited

U.S. PATENT DOCUMENTS

| | | | |
|---|---|---|---|
| 4,086,161 A | 4/1978 | Burton | 210/13 |
| 5,087,353 A * | 2/1992 | Todd et al. | 210/94 |
| 5,337,516 A | 8/1994 | Hondulas | 47/65 |
| 5,486,291 A | 1/1996 | Todd et al. | 210/602 |
| 5,528,856 A | 6/1996 | Smith et al. | 47/59 |
| 5,766,474 A | 6/1998 | Smith et al. | 210/602 |
| 5,799,440 A | 9/1998 | Ishikawa et al. | 47/65 |
| 6,274,047 B1 | 8/2001 | Bates et al. | 210/747 |
| 6,811,700 B2 | 11/2004 | Austin et al. | 210/602 |
| 2007/0124995 A1 * | 6/2007 | Kania et al. | 47/59 R |
| 2008/0120903 A1 * | 5/2008 | Fair et al. | 47/65.7 |
| 2009/0288341 A1 * | 11/2009 | Kania et al. | 47/64 |

FOREIGN PATENT DOCUMENTS

JP         63-209795 A    *   8/1988

OTHER PUBLICATIONS

"Artificial Marshes for Wastewater Treatment" by B. C. Wolverton, Ph.D., Natl. Aero. and Space Admin., Natl. Space Tech. Lab., MS, (1986).
"Microbial processes influencing performance of treatment wetlands: A review" by Jennifer L. Faulwetter et al., Ecological Engineering (2009).
"Role of Aquatic Plants in Wastewater Treatment by Artificial Wetlands" by R. M. Gersberg et al.; Wat. Res. vol. 20, No. 3, pp. 363-368, 1986.
"Mitigation of agricultural nonpoint-source pesticide pollution in artificial wetland ecosystems" by Caroline Gregoire et al., Environ. Chem. Lett., 2008.
"Wetlands and Aquatic Processes" by Winthrop C. Allen et al., J. Environ. Qual. 31: 1010-1016 (2002).

* cited by examiner

*Primary Examiner* — Fred Prince
(74) *Attorney, Agent, or Firm* — Jacobson Holman PLLC

(57) ABSTRACT

Apparatus to treat pollution in rivers, streams, lakes, bays, ports and all bodies of water, employing as methodology wetland plants or macrophytes growing atop a wire or rigid frame basket filled with polygons or other irregular shaped objects of various configurations. The root system of the macrophytes are merged with and grow down amid the substrate composed of small polygons, other irregular shaped hollow, plastic, ceramic objects or other materials. The substrate provides nutrients, oxygen and sanctuary to bacteria, thereby reducing and eliminating pollutants in all bodies of water.

18 Claims, 7 Drawing Sheets

APPARATUS MERGING WETLAND PLANTS WITH A FLOATING SUBSTRATE TO TREAT POLLUTION IN ANY RIVER, LAKE OR BODY OF WATER

FIELD OF THE INVENTION

The present invention relates to the field of treatment of moving polluted water by the use of wetland plants.

BACKGROUND OF THE INVENTION

The present focus of treating human and industrial wastes is to employ mechanical systems such as activated sludge. There are certain advantages to this process, 1) reasonably compact as to the space it occupies; 2) treats and processes large flows; and 3) meets stringent E.P.A. requirements. Disadvantages, significantly, 1) expensive to build, operate and maintain; and 2) large user of electric power.

Traditionally, prior to reliance on mechanical systems, communities early on began to dispose of their sewage across rock filters, allowing natural processes such as algae, mosses, bacteria colonies to treat and reduce the polluted stream. A rock filter was simply a dug out basin filled with gravel. However, microbial colonies require oxygen as well as food supplied by the polluted stream, which these rock beds could not adequately supply.

Early in the twentieth century, trickling filters became popular. Sewage was sprayed over a holding basin filled with rock. This reduced the land area requirements, yet essentially the same filtering treatment process was used, moss, algae, complemented by microbes to reduce the pollution. Oxygen supply to the microbes increased yet still remained a limiting factor and as E.P.A. standards became more stringent, municipalities became to rely on the mechanical activated sludge system.

In the mid-twentieth century, scientists took an interest in wetland plants, observing that natural wetlands were eliminating pollution, pathogenic bacteria, and purifying ground-surface waters. A technology evolved whereby wetland plants were planted atop rock or sand beds and municipal primary sewage was admitted into these beds in varying configurations. Some waste streams were flowed across the surface of the beds, others as subsurface flows. Still a third began as surface flow, then vertically through the bed, filtering around the root system imbedded in the rock, sand substrata.

Wetland treatment successes depend on the ability of the macrophytes (wetland plants) to transport oxygen from the air to their root and rhizomes. Wetland plants such as cattails, bulrushes, reeds, *canna* lily, elephant ears, arrowhead, arrow arum, green taro, canex retriculata, schoenplectus and many others, have the common ability to transport oxygen from their leaves or stalks to their roots or rhizome areas through their vascular network called aerebchymas cells.

A healthy root system of the plant is maintained, even in extremely cold weather, by these cells' abilities to translocate oxygen to the roots even when the leaves or stems have died back as winter set in. It is oxygen supplied to the root systems which supports bacteria colonies responsible for reducing and purifying the wastewater stream.

"These vascular oxygen transferring cells occupy 60% of the plant structure. In addition to the microbial population that these plants support, the root systems act as filters and symbiotically produce metabolites which are a food source for microorganisms", cited from B. C. Wolverton, scientists with the National Aeronautics Space Administration, 1986.

"Wetland plants reduce pollutants by the following processes: sedimentation filtration, adhesion and uptake. However, the primary, major mechanisms are respiration and fermentation by diverse colonies of microbes which break down organically derived pollutants into assumed harmless substances as $CO_2$, $N_2$ and $H_2O$ (water)". Ecological Engineering 1435, page 6.

It is an object of the present invention to replicate the successful usage of wetland plants to treat polluted water in a terrestrial environment by the use of this apparatus to treat pollution of all types in watery environments such as rivers, lakes and all bodies of water. It is now therefore convenient to explore the operational usages and successes of wetland plants in treating primary wastewater in cultivated basins across Mexico, U.S., Canada, Europe and Korea.

The National Aeronautical Space Administration conducting 15 years of experimentation at its National Space Technology Lab in Southern Mississippi provided the following report presented by Mr. B. C. Wolverton in April 1986. Using reeds (*phragmites communis*), cattails (*typha* sp.) *canna* lily, arrowhead, arrow arum and green tare in cultivated (constructed wetlands) made the following observation:

"Biochemical oxygen demand substances were reduced an average 92.3%, in 24 hours, industrial chemicals, benzine reduced 99.98%, toluene reduced 99.985% p-xylene 99.94% all in 24 hours. Chloroform reduced 68% and tetrachloroethylene 75% also in 24 hours. The wetland roots then produce metabolites used as a food source by the microorganisms. These plants also add to the microbial filter capacity of removing toxic heavy metals and radioactive elements from the wastestream through the constructed (cultivated) wetland." Wolverton described pollutant degradation as "microbial adaptation to using carbon sources from various organic chemicals by recruiting genes from existing plasmoids to make new plasmoids. These new plasmoids then encode for enzymes to convert the carbon source into compounds useful for energy and cell mass synthesis."

The European Union in a three-year project, ARTWET, beginning October 2006 cultivated 11 wetland plots in Germany, France and Italy, testing reduction of herbicides, fungicides and insecticides complemented the N.A.S.A. observation, above, regarding the process of degradation as follows, "Macrophytes aerenchyme cells transport and deposit oxygen on the root surface one to four mm oxygen film, developing voltage potential $E_h$ −250 to 500 mv. directly on root surfaces which allows aerobic heterotrophic microorganisms to quickly grow and to degrade organic compounds as pesticides". "Oxygen transfer, except in winter, is 100 to 200µ moles of $O_2$ oxygen per hour per gram of dry root mass." This amounts to approximately 0.0016 grams of oxygen per hour per gram of dry root mass.

In a review of microbial processes influencing performance of wetland plants, Ecological Engineering 1435, page 5 provides additional insight how the microbe process works, "Respiration and fermentation are the major mechanisms by which micro-organisms break down organically derived pollutants into harmless substances such as nitrogen gas, carbon dioxide and water. Furthermore, products as sulfides generated by some types of respiration can enable other known removal mechanisms such as precipitation and sequestration of heavy metals within the wetland matrix. In respiration, the microbes induce a transfer of electrons from a donor compound of a higher energy state (typically a carbon compound) to an electron acceptor of a lower state, using the energy difference for growth and reproduction—this process depends on oxidation-reduction conditions. High redox (oxidation-reduction) potential is associated with an oxidized environment and promotes aerobic processes as nitrification (reduction of nitrate compounds to $NO_3$ and $NO_2$). Low redox potential promotes anaerobic processes such as sulfate reduction and methanogenises, also reduction of $NO_3$ and $NO_2$ to nitrogen gas, manganese, iron (sulfates are reduced from soluble forms and become precipitates), in the anaerobic environment that exists distances greater than one to one and a half inches from the plant's root. As the distance from the root increases, the anaerobic conditions also increase and the redox potential in this area range from 100 mv to −350 mv." The following field studies of cultivated (constructed) wetlands from Southern California to Canada demonstrate that wetland plants can remove pollution of every sort from polluted waste streams in our environment. The San Diego Region Reclamation Agency at Santee, Calif. cultivated four test plots, each 696.6 square feet in area, under the direction of C. R. Goldman, R. M. Gersberg, B. V. Elkins, S. R. Lyons. Wetland plants in separate beds were bulrushes, cattails, reeds and an unvegetated or control bed.

Test period began August 1983 and ended December 1984. Primary wastewater was introduced flowing horizontally subsurface through a strata of gravel in each bed. The following average results were achieved: the bulrush bed removed 96% of biochemical oxygen demand, 94% of suspended solids, 96% of ammonia, B.O.D. and suspended solids were less than 10/10 mg/l, standard for advanced E.P.A. secondary treatment. Ammonia was less than 2 mg/l. The reed and cattail beds were less successful. Reductions were: B.O.D. 81%, 74%, suspended solids 86%, 91%, ammonia-nitrogen 79%, 54%, respectively. Input concentrations were 118 mg/l for B.O.D., 57.3 mg/l for suspended solids and 24.7 mg/l for ammonia.

The authors said "at this wastewater application rate, 20 acres of wetlands would be required to treat one million gallons/day." Analysis and results of this test was reported in Water Resources Vol. 20, No. 3, pp. 363-368 (1986). The authors further commented as follows: "Of course studies were carried out in San Diego region of Southern Cal. where winter minimum water temperatures do not go much below 12 degrees Celsius (53.6° F.). Other investigators, however, have found that artificial (cultivated) wetlands are well suited for wastewater treatment even in moderately cold climates as Ontario, Canada where they can be operated year round (the wastewater flowing beneath the surface layer of ice) and produce an excellent effluent in all seasons."

In a moderately cold climate of Iselin, Pa., a 7,875 square foot wetland basin flowing 6,800 gals/day horizontally, subsurface produced the following average pollution reduction in summer: biochemical oxygen demand 98%, suspended solids 90%, fecal coliform 100%, ammonia-nitrogen 93% and phosphorus 90%, comparable to the results achieved at the Santee, Calif. treatment plots. The operational periods at Iselin, Pa. began March 1983 and results tabulated to September, 1985. During the winter months, reductions of biochemical demand 96%, suspended solids 88%, fecal coliform 100% and ammonia-nitrogen 54%. It should be noted that Iselin used cattails and reed plants. Bulrushes that proved most effective in pollution reduction at Santee, Calif. were not used.

The observed average hydraulic flowing rate is approximately 0.42 gals/ft. square of wetland plant area. Despite the Iselin, Pa. hydraulic loading rate being 0.86 gals/ft. square of wetland plant area, twice the observed average, the results were impressive. It should also be noted that the longer pollutants are in contact with the root and rhizomes of these plants, the cleaner the water will become.

In a much colder climate of Listowel, Canada, using cattails in a 3,593 square foot cultivated marsh with municipal wastewater flowing at the rate of 4,367 gal./day across the surface of the cattail bed system, the average winter pollution reduction, January 1981 through April 1981, was as follows: biochemical demand 73%, suspended solids 84.3%, total phosphorus 73.5% and ammonia-nitrogen 22%.

There were several factors that limited the effectiveness of this wetland treatment:

1) The hydraulic flow rate was 1.22 gals. per square foot of wetland area, three times the observed rate of other similar facilities;

2) wastewater flowed across the surface of the wetland basin, limiting contact of the pollution stream with the root and rhizomes of the plants; and 3) the use of cattails as opposed to the use of bulrushes that proved so effective at Santee, Calif. test plots. Documentation of this plants' performance was entered January 1981 through August 1981. The summer months reduction at Listowel, May through August 1981: biochemical oxygen demand 75%, suspended solids 92%, total phosphorus 78.3% and ammonia-nitrogen 44%. Note again that, as the hydraulic rate increases, the contact time for pollutants to exposure to the microbes decreases, resulting in decreased reduction of pollutants.

As most fertilizers, urea, have high concentrations of nitrogen, their removal rates by wetland plants has been well documented and illustrated in the above examples. Chemicals such as herbicides, fungicides (pesticides) and insecticides are present in agricultural runoffs during the spring and summer growing season, and are pollution factors in rivers, though E.P.A. has not listed them as products with restricted applications. There has been limited research on reduction of these chemicals and, complicating matters further, there are so many different molecular and compound structures that are called pesticides and insecticides.

A European Union study called ARTWET, conducted years 2006 to 2008, reported a 54% reduction of pesticides by wetland plant cultivated basins. Cited by Springerin Environ. Chem. Lett. (2008), the author states "A lack of mitigation efforts through treatment leads to diffusion of pesticides throughout the environment with impact on wildlife and human health". In Mississippi, using surface treatment along a 50 meter vegetated ditch, pesticide reduction of 99% was reported. Shultz and Peale reporting in J. Environmental quality 30: 814, also noted in Springer, Environ. Chem. Lett. (2008), that "a reduction of toxicity greater than 90% was achieved in South Africa." These authors also noted that "a fruit orchard runoff into a 1.1 acre reed bed resulted in 90% reduction of aqua phase insecticide and particulate insecticide was removed 100%."

Excellent results were realized in reducing pesticides using wetland plants by using *Coriolus Versicolor, Hypholoma Fascioulare, Stereum Hersutum*. In 42 days, diuron atrazine, terbuthylozene were reduced greater than 86%. After the wetland plants matured for two years, the herbicide, atrazine was reduced by microbial action in seven days.

The recommended flow velocity is one foot per second. Shultz and Peale comment further, "amount of pesticide carried in surface water runoff varies from 1 to 10 percent. Though this percentage is only a fraction of the applied chemical, the effects are high enough to exhibit biologically relevant effects. Concentrations as high as 300 mg/l have been reached."

Pharmaceuticals and health care products are making an increasing appearance in drinking water. These are generally not removed in water treatment plants. The Korean Institute of Science, in collaboration with Southern Nevada Water Authority, issued findings in 2008 on removal rates of pharmaceuticals with the use of wetland plants. Thirty micropollutants including pharmaceuticals, endocrine blockers and personal care products were tested at the Damyang waste water treatment plant.

A constructed (cultivated) wetland, planted in cattails, 16,499 square feet of area treating 63,517 gals./day, tested nine pharmaceuticals found in high concentrations in the waste stream. Waste water stream was introduced in horizontal, subsurface flow and after six hours, five of the nine pharmaceuticals treating hypertension, convulsion, inflammation and infection were reduced, ranging from 65% to 98%. An anti-infection sulfamethexacole was reduced 30%. Delantin, an antiepileptic reduced 5% in May testing, 70% reduction in August, Diazepain, a tranquilizer reduced 6%, fire retardant reduced 10%.

As described earlier, microbial treatment in moderately cold climate of Pennsylvania and colder climate of Canada have successfully treated and reduced polluted wastewater streams. Allen et al. report in Journal Env. Quality, 31, pp. 1010-1016 "that diurnal oxidation-reduction by macrophytes (wetland plant) corexretriculates, and schoenplectus (was successful) at 4 degrees Centrigrade (39 degrees F.).

There does not exist a more versatile, successful and natural means of removing polluting wastestreams containing human, animal wastes, pesticides, fungicides, insecticides, fertilizer, urea, ammonia, dissolved heavy metals, radioactive metals, industrial chemicals and pharmaceuticals as this apparatus herein described from all bodies of water such as rivers, lakes, streams or port areas.

Wetland plants, bulrushes, cattails, etc. survive in marshes under water environment by translocating air to its root system. Oxygen leaking from the roots support colonies of bacteria which consume, treat and degrade a wastewater stream (municipal).

My prior U.S. Pat. No. 5,337,516, hereby incorporated in its entirety by reference, was designed to eliminate practically all media from the wetland basin, thus permitting unrestricted growth of the plant root and rhizome system, greatly reducing the land area needed to treat comparable flow of waste water to approximately one fourth to one fifth the size presently required in existing systems. Thus, less land treated more waste water, making this an attractive and cost effective means of treating municipal and industrial waste water in quantities of one million gallons per day and more. It eliminates the necessity of pretreatment as the entire floor of the basin can now be utilized as a receiver for the settable solids, as the solids media that once occupied the entire basin, is now absent. The absence of solid media means that raw waste water can be directly admitted into the basin without the necessity of building a primary tank. The size or floor area of the wetland basin is on the order of 100 times greater than that of a primary tank. Hence, it is possible that this greatly enlarged floor area of the basin can be utilized to reduce or degrade settled solids through anaerobic and facultative bacterial action whereas by contrast, the floor area of the primary tank being smaller and not designed for treatment but only for collection purposes, is an expensive necessity when a basin for wetland basin is filled with solid media, but is not a necessity when a basin for wetland plants can be designed and operated without such a solid media. As a great deal of the settled solids are treated and reduced on the wetland basin floor, further treatment and reduction facilities, such as anaerobic or aerobic digesters can be downsized to less than half in size and cost as those that would otherwise be required using the present technology.

The apparatus, and process of my prior patent was intended to take wetland plants that have no natural capacity to float in water but are rooted to the bottom of wetlands, swamps, etc. and to create for them an artificial floating habitat. This is accomplished by constructing a basket or container which, in addition to a wetland plant, will contain rich earth, humus, clay, and among other options, activated carbon, charcoal, sand, burned and unburnt wood, which materials act as filters and assist the weighted matter to float better in the waste water to be treated and also basically to serve as a life support system to the wetland plant. In addition the basket or container will be attached to floats that will better enable the wetland plant to float in the waste water basin.

Each wetland plant habitat or container can preferentially be attached to others in a row by means of cables or ropes which are in turn anchored to posts along the perimeter of the basin. This will allow the operator of the basin to winch the cable or rope over to the side of the basin to remove or add additional plants and life support systems and then reintroduce them back into the basin.

The basket material may preferentially be any material supported by some rigid frame such as webbed construction so that the plant roots and rhizomes may grow through the basket into the waste water filled basin with life support material consisting of earth, clay, humus and other materials as described above. The basket material should be sufficiently open weave and porous to permit free flow of waste water into the plant habitat.

The plant container can preferentially also contain an adjustable floor so that it defines the limits of the root system that can grow downward toward the floor of the basin. As the root and rhizome area of the plants generate an aerobic environment, the operator of the basin can, by varying the vertical placement of the adjustable floor, increase or decrease the aerobic and anaerobic zones within the basin. When the basin depth is increased, perhaps four or five feet or even more, the amount of waste water in the basin for treatment is thereby also increased. The operator of the basin has the option to lower the adjustable floor thereby permitting and allowing the plant roots and rhizomes to grow vertically expanding the volume within the basin that will treat the polluted water within it, aerobically.

SUMMARY OF THE INVENTION

Unlike terrestrial sites where land is a limiting factor in wetland treatment processes, this limitation does not apply where this science is applied to bodies of water. The only limiting factor of the present invention is the acreage of this apparatus to be installed along the banks of rivers, bays, etc. and a commitment to clean up the environment.

An object of the invention is to take wetland plants, place them aboard floats in bedding six to eight inches apart and on a platform under the plants, install solid materials such as plastic/ceramic polygons which contain indentations, as well as openings through them, allowing refuge for colonies of bacteria to thrive and multiply. They would thus not be swept away, and the cell residence time would be greatly increased. It has been recently found that wetland plants not only provide air, but nutrients from its root system, such as sugars and proteins providing a symbiotic relationship with the bacteria colonies.

A constructed wetland would be created residing not on land, but floating out in polluted rivers, streams and lakes of North America.

The present invention includes an apparatus to treat pollution in rivers, streams, lakes, bays, ports and all bodies of water, employing as methodology wetland plants or macrophytes growing atop a wire or rigid frame basket filled with polygons or other irregular shaped objects of various configurations. The root system of the macrophytes are merged with and grow down amid the substrate composed of small polygons, other irregular shaped hollow, plastic, ceramic objects or other materials.

The merger of wetland plant root systems with the substrate herein described provide a sanctuary for diverse colonies of microbes which, when supplied with oxygen translocated to the root system of the wetland plants, treat, oxidize-reduce organic, inorganic pollutants. Oxygen thus translocated, leak from the root, rhizomes of the wetland plants, thus supporting the microbe colonies which enable oxidation-reduction processes to occur.

Wetland plants are generally any number of plants that thrive in a watery environment. The hollow and/or irregular shaped polygons or objects with indentations or cavities will provide surfaces to which microbes will attach, slow the river currents and also permit microbe colonies to freely circulate and multiply. This will allow space and time for the symbiotic relationship of wetland plants and microbes to oxidize-reduce industrial chemicals, pesticides, insecticides, fertilizers, urea, human and animal wastestreams and dissolved and/or radioactive metals.

Wetland plants of all types can be grown atop the substrata herein described. The hollow plastic, ceramic or objects of other materials will be designed to provide buoyancy to the apparatus, allowing the plants to grow near the surface of any body of water. The merger of the wetland plants and their root systems with the substrata herein described will enable sedimentation, precipitation oxidation-reduction processes to occur hastening the removal of pollutants from these bodies of water.

The irregular shaped objects filling the substrate will be of varying dimensions, preferably two to three inches in diameter allowing adequate space for the wetland plant root systems to distend downward their full length, approximately three feet. The width and length of the apparatus can be of any dimension with the depth of the apparatus equal to the expected root length. Agricultural runoffs from dairy, cattle and swine operations will be successfully treated. These cultivated plots are also referred to as constructed or artificial wetlands.

It is the object of this invention to replicate the success of land based cultivated plants to treat pollution in all bodies of water.

It is another object of the present invention to provide a plurality of framed baskets with a top layer of at least one wetland plant and a life-sustaining amount of a particulate solid media for the wetland plant.

It is yet another object of the present invention to provide a plurality of framed baskets with a top layer of at least one wetland plant and a life-sustaining amount of a particulate solid media for the wetland plant with the framed baskets including a hollow polygynous sphere of plastic, ceramic or other floatable material.

It is still yet another object of the present invention to provide a plurality of framed baskets with a top layer of at least one wetland plant and a life-sustaining amount of a particulate solid media for the wetland plant with a bumper protecting the baskets and diverting water current flow into and down through the baskets for downstream release of treated water.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the apparatus merging wetland plants with a floating substrate to treat pollution in any river, lake or body of water disclosed herein, and are for illustrative purposes only. Other embodiments that are substantially similar can use other components that have a different appearance.

DETAILED DESCRIPTION OF THE PREFERRED EMBODIMENTS

Figure 1:
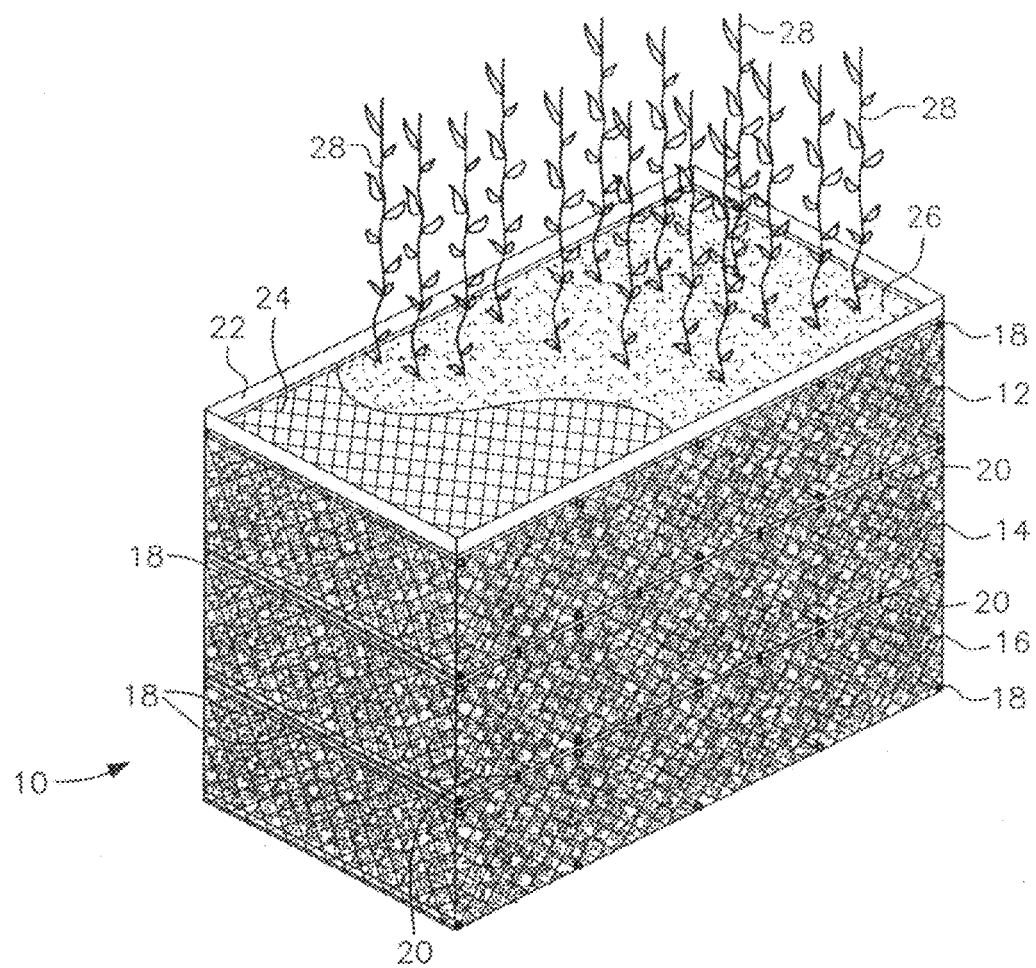
FIG. 1 is a perspective view of a plurality of framed baskets having wetland plants supported by a life-sustaining amount of a particulate solid media and the three baskets designed to operate as a single pollution treatment apparatus.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
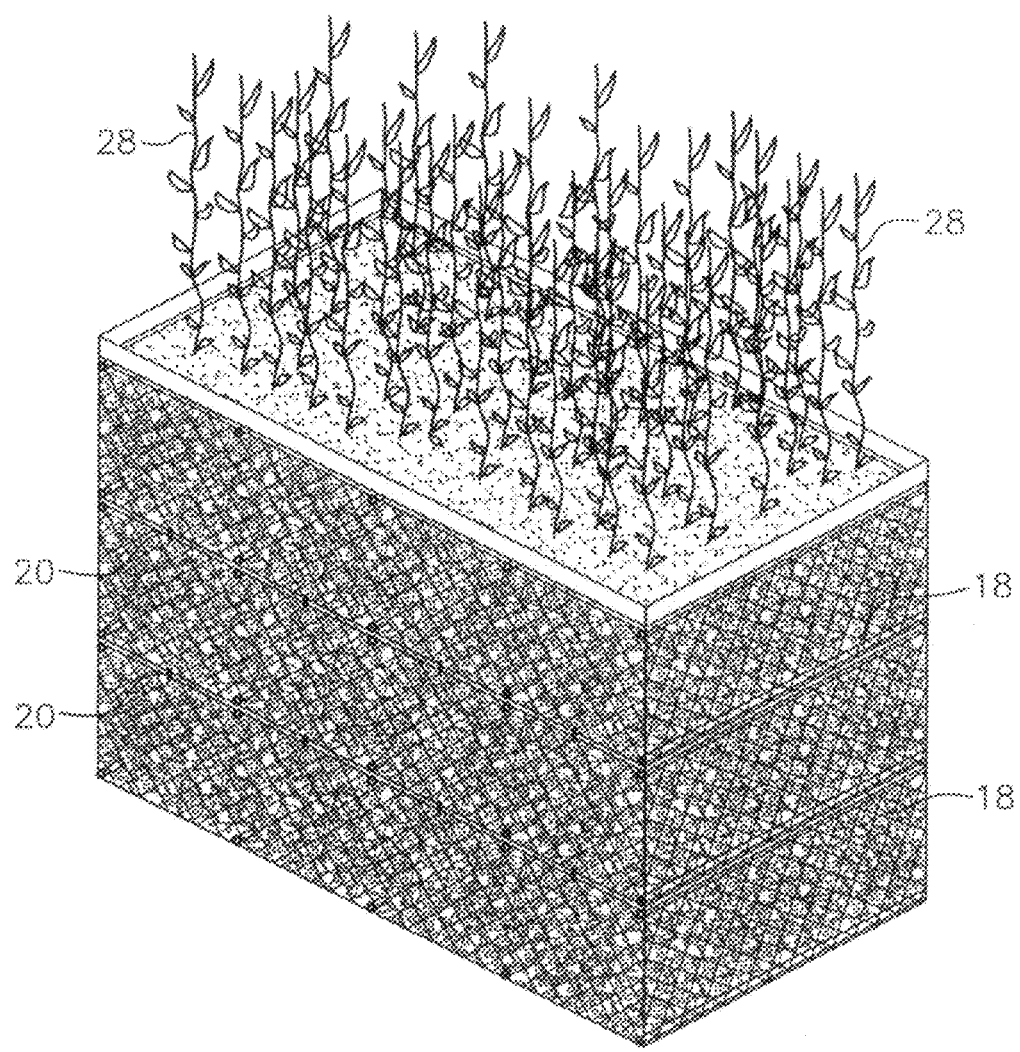
FIG. 2 is a perspective view of the system shown in FIG. 1 taken from an opposite end.

With reference to drawings, in general, and to FIGS. 1 and 2, in particular, an apparatus merging wetland plants with a floating substrate to treat pollution in any river, lake or body of water providing the teachings of the subject invention is generally designated as 10. With reference to its orientation in FIG. 1, a wetland plants' supporting system includes three tiers 12, 14, 16 of plastic coated wire framed baskets. Each basket includes a plurality of solid support rods 18 spaced along the upper and lower edges of each basket. In addition, basket 12 is connected to basket 14 and basket 14 is connected to basket 16 by a series of clips or connectors 20.

On top of the uppermost basket 12 is located a retaining band 22 of one to two inches in height. Held within the retaining band 22, above the plastic coated wire 24, having openings of 0.2 to 0.3 inches, is located a thin layer of plant life sustaining material such as soil 26, including a light straw underlay, of a depth of one to two inches. Alternatively, the soil layer may be humus. Additionally, the plant life sustaining material may be at least one of clay, activated carbon, charcoal, sand and burned or unburned wood.

Anchored in the soil 26 is a plurality of wetland plants 28 as previously described. The roots of the plants 28 migrate through the tiers of baskets 12, 14 and 16 to hold the plants and its supporting media in place.

A bumper 36 is cantilevered to project ahead of the sides of the assembled baskets so as to provide protection against accidental collision with foreign objects when the assembled baskets are placed in a current of water. As shown with reference to FIG. 3, incoming water current 38 passes over cantilever bumper 36 and into soil 26. The stacked tiers of baskets 12, 14, 16 are interconnected by clips 20. Water current, after initially passing horizontally onto the soil 26, migrates through the basket 12 out into the river and to the basket 14 and finally to the basket 16 in a vertically downward movement. Arrows 42 indicate the direction of movement of water through the baskets with the current.

Figure 3:
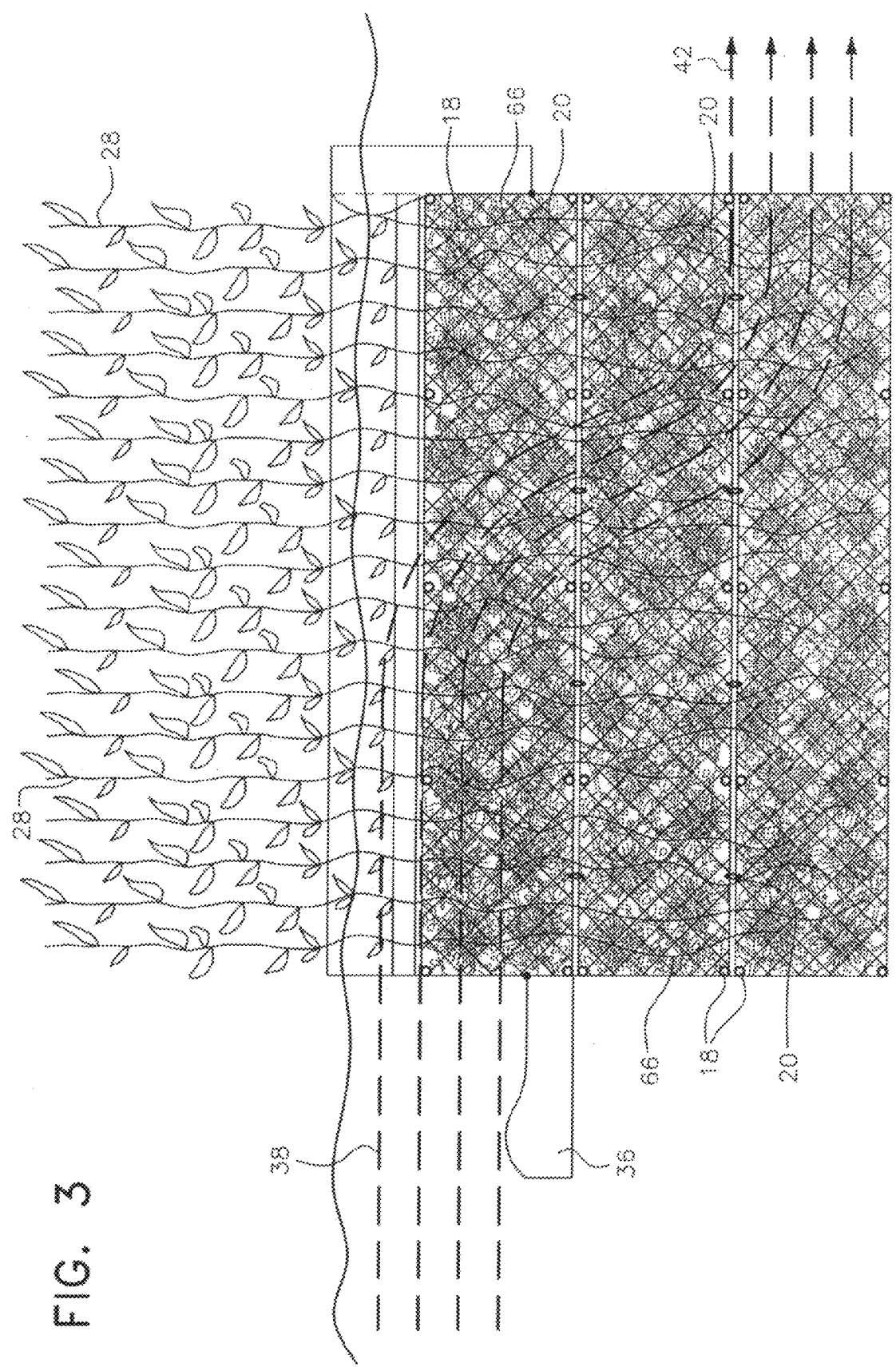
FIG. 3 is an in situ sectional view of the baskets.
Figure 4:
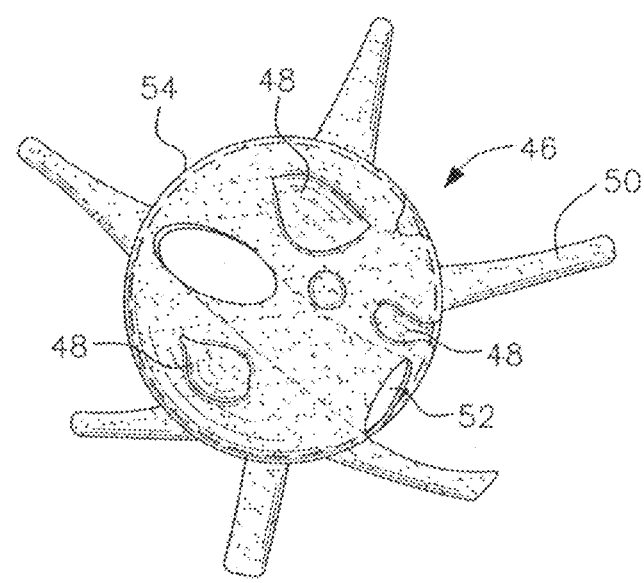
FIGS. 4, 5 and 6 are elevational views of preferable hollow polygons or spheres made of plastic, ceramic or other suitable material for supporting and floating wetland plants anchored in baskets.
Figure 5:
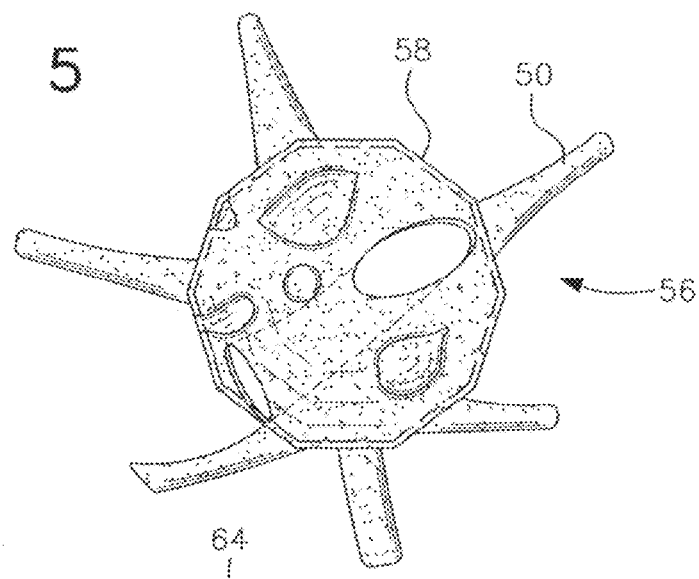
Figure 6:
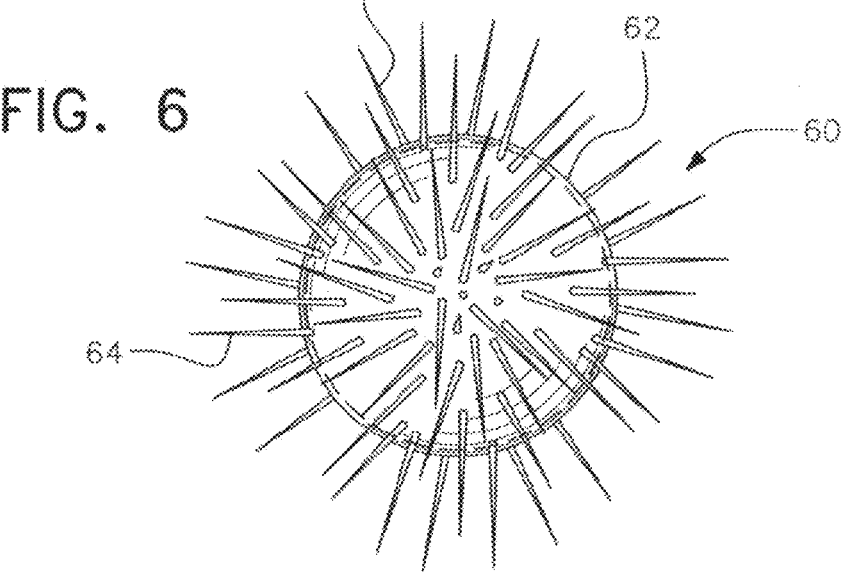

With further reference to FIG. 3, each of the baskets 12, 14 and 16 are filled with multi-faceted media, such as a hollow polygon or sphere of plastic or ceramic material as shown in FIGS. 4 through 6. In FIG. 4, a hollow sphere 46 includes a plurality of indentations 48 and cavities 52. Projections 50 extend one to two inches from the body of the sphere. The diameter of the sphere body 54 may vary between one to two inches. The exterior surface of the body 54 includes a roughened texture to promote engagement of the root system of the plants. Similarly, polygon 56 has a body 58 of a polygonal exterior surface having similar indentations, projections, cavities and roughened texture as in sphere 46.

Sphere 60 includes a hollow spherical body 62 with a plurality of thin protrusions 64 projecting ¾ of an inch to two inches away from the body 62. The projections 50 in FIGS. 4 and 5, and 64 in FIG. 6, act as a filter in moving water, slowing the currents and increasing retention time of pollutants within the floating constructed wetlands.

As best shown in FIG. 3, the mixture of various shaped and configured bodies in the baskets 12, 14 and 16 provide a convoluted path for water flow and anchorage for the roots 66 of the plants 28. The slowed water currents increase treatment time of the pollutants in the water.

Each treatment unit consisting of three baskets, 12 inches in height, containing polygons or other hollow spherical objects are designed to aid flotation, and retain bacteria colonies, allowing them to multiply and circulate without being swept downstream by currents.

These treatment units float in water, near and adjacent to rivers, lake banks, in long extended rows. The lead unit or units is subject to currents or wakes from passing craft. Bumpers 36 extend parallel to river or lake bottoms, while the remaining bumpers are upright to retain and divert the surface waters down into the substrate for treatment.

Figure 7:
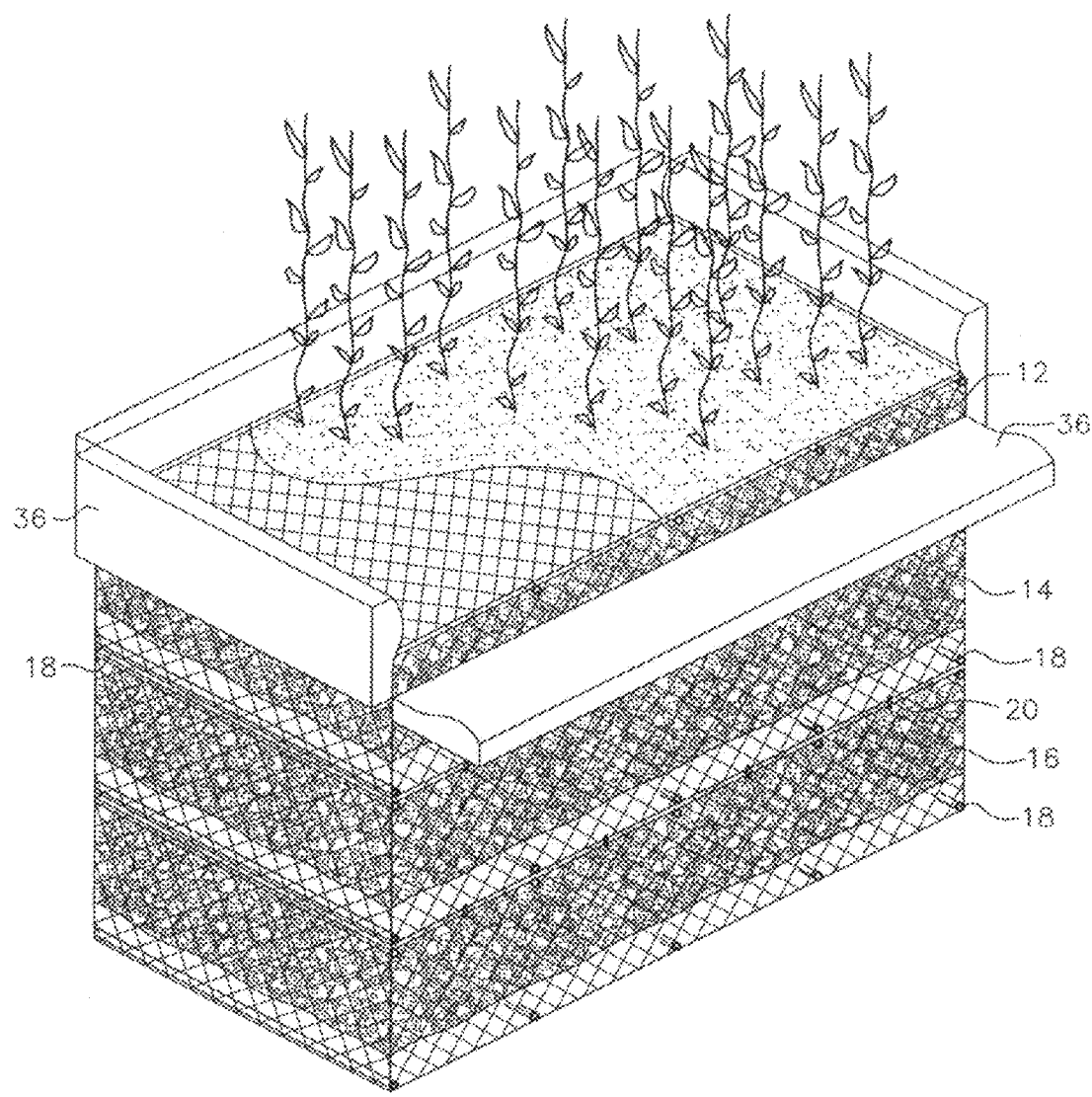
FIG. 7 is a single pollution treatment apparatus having pivotal bumpers.
Figure 8:
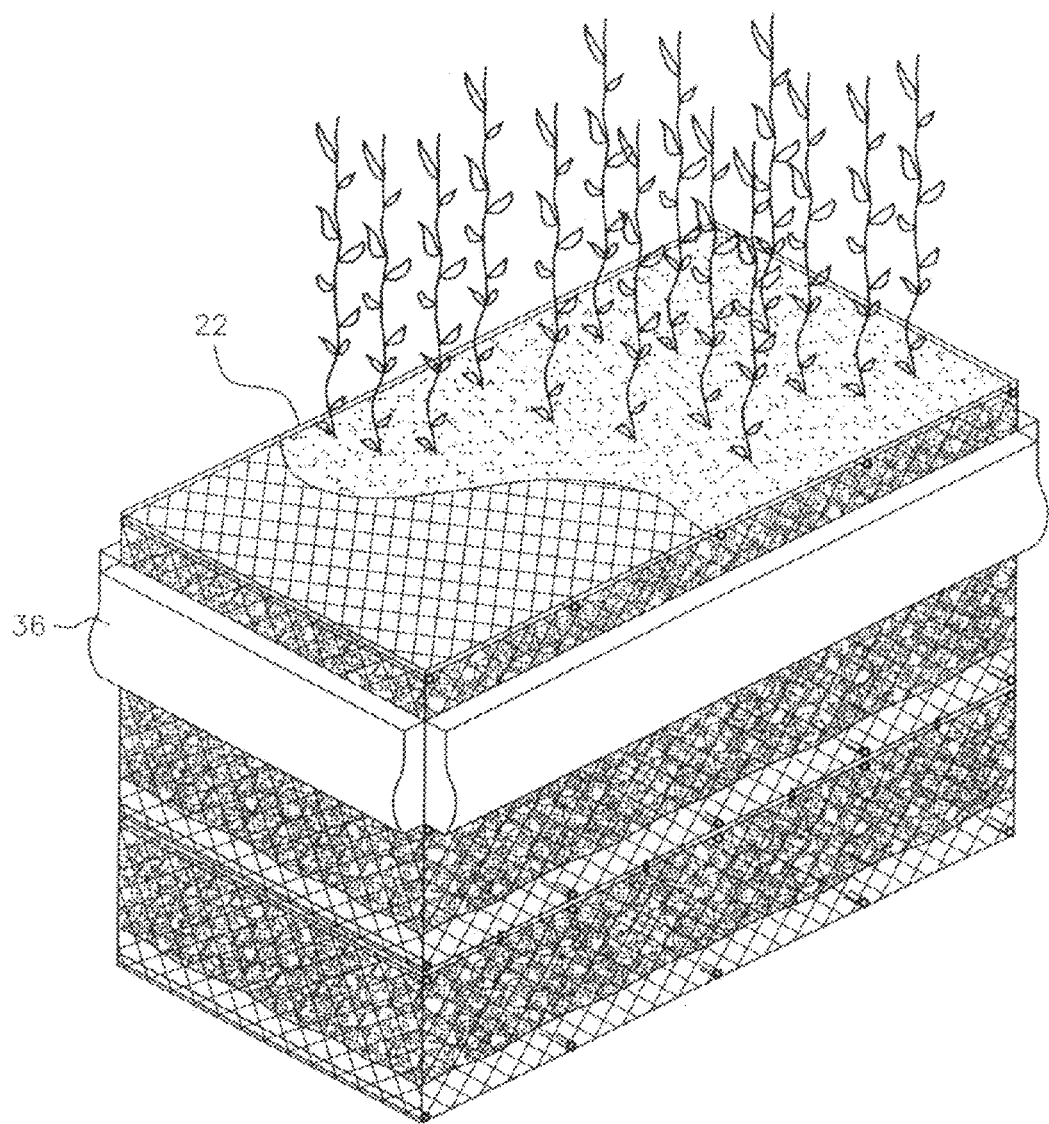
FIG. 8 illustrates all of the bumpers lowered alongside a pollution treatment apparatus.

All the treatment units downstream or closer to the bank will be as shown in FIG. 1. But, if there is a need to make them buoyant or to protect them, then the bumpers 36 will be as shown in FIG. 8. When the bumpers are as shown in FIG. 7, bumper 36 is a flow diverter.

The outer row of treatment units as shown in FIG. 1 may require bumpers 36 as shown in FIG. 8. In the position shown in FIG. 8, the bumpers protect the treatment unit of baskets as well as other treatment units in adjacent rows nearer the banks of rivers or lakes.

Figure 9:
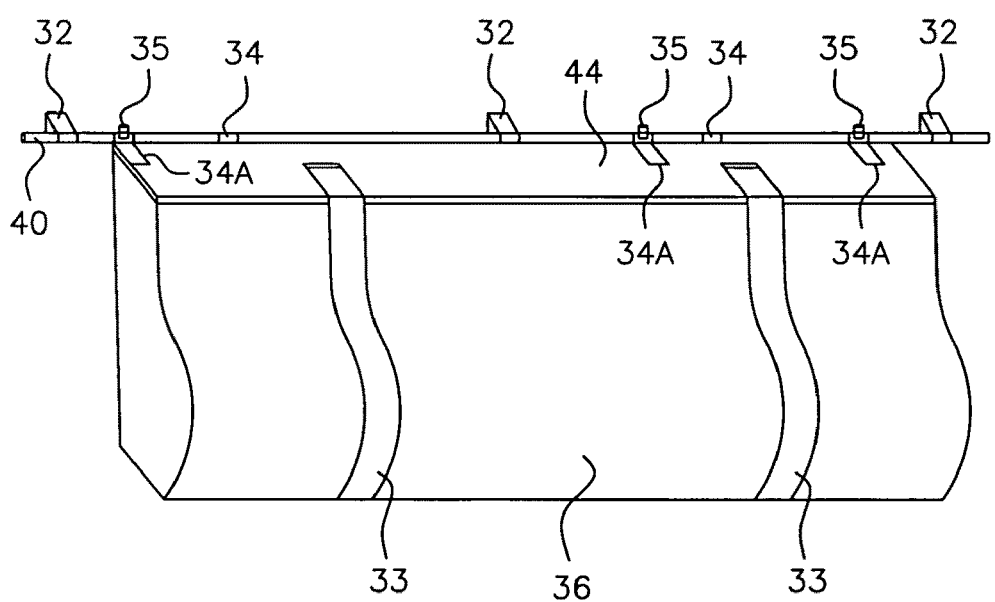
FIG. 9 is an enlarged sectional view of a pivotal bumper mounted on a pollution treatment apparatus.

The bumpers 36 consist of styrofoam like material encased in heavy plastic, 6 mil or greater thickness, attached to a solid plastic frame 44 as shown in FIG. 9. Bumper 36 is attached to frame 44. The solid frame 44 in turn is secured to a rod 40 passing through clips 32. Loops 34 and 34A are mounted to guide the rod 40 with loops 34A engaged by set screws 35 so that the bumper which can be rotated 180 degrees, from vertical up to vertical down positions, and the bumper can be positioned and locked by set screws 35 at any desired angle. Straps 33 secure the bumper 36 to solid frame 44 by screws or rivets.

Aerobic and anaerobic zones are created within each treatment basket. For that reason, the three baskets are each partially filled with hollow polygons as shown in FIG. 7. The hollow buoyant polygons rise to fill the top of each basket, providing buoyancy, and increased aerobic activity while the empty one to two inch spaces near the bottom of each basket will become more anaerobic. The plant roots will extend through these open spaces near the bottom of each basket. However, aerobic bacteria will be numerous within an inch of the root system. Beyond that anaerobic bacteria will flourish.

Where polygons are present, the polygons will trap and retain oxygen from the root system, thus sustaining aerobic activity. Anaerobic bacteria play an important role in reducing nitrate, nitric, sulfate compounds and many other organics.

The bumpers 36 may be buoyancy positive, assisting in the flotation of the assembly in natural bodies of water, as well as acting as a diverter of the flow of water. The bumpers 36 may also be buoyancy neutral, again serving as a diverter for water flow and preventing accidental collision with foreign objects. The spheres and polygons would thereby assist in flotation of the assembled baskets.

By the present invention, dwell time of pollutants in a moving body of water is increased within the assembled baskets. The area of treatment is only limited by the surface area of the water. The advantages of wetland plants is thereby used to remove pollutants and release cleaner water into the natural currents of a body of water.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A pollution treatment apparatus for placement in a body of water, said pollution treatment apparatus comprising
at least one basket of multi-faceted media,
said at least one basket floating in said body of water by a buoyancy of said multi-faceted media,
at least one wetland plant and a life sustaining amount of a particulate solid media for said wetland plant, said at least one wetland plant and said life sustaining amount of said particulate solid media being located on top of said basket,
said multi-faceted media allowing a root system of said wetland plant to be retained in said basket.

2. The pollution treatment apparatus according to claim 1, wherein said multi-faceted media is hollow.

3. The pollution treatment apparatus according to claim 2, wherein said multi-faceted media includes elongated irregular projections.

4. The pollution treatment apparatus according to claim 2, wherein said multi-faceted media includes elongated uniform projections.

5. The pollution treatment apparatus according to claim 1, wherein said multi-faceted media includes through openings.

6. The pollution treatment apparatus according to claim 5, wherein said multi-faceted media includes a central body having a roughened surface.

7. The pollution treatment apparatus according to claim 1, wherein three baskets of multi-faceted media are connected together.

8. The pollution treatment apparatus according to claim 7, wherein a cantilevered bumper is pivotally mounted on one of the three baskets.

9. The pollution treatment apparatus according to claim 8, wherein a plurality of said cantilevered bumpers surrounds said one basket.

10. A pollution treatment apparatus for placement in a body of water, said pollution treatment apparatus comprising
   three baskets of multi-faceted media,
   said three baskets floating in said body of water, said multi-faceted media supporting said three baskets at an upper surface of the body of water,
   at least one wetland plant and a life sustaining amount of a particulate solid media for said wetland plant, said at least one wetland plant and said life sustaining amount of said particulate solid media being located on top of said three baskets,
   said multi-faceted media allowing a root system of said wetland plant to be retained in said three baskets.

11. The pollution treatment apparatus according to claim 10, wherein said multi-faceted media is hollow.

12. The pollution treatment apparatus according to claim 11, wherein said multi-faceted media includes elongated irregular projections.

13. The pollution treatment apparatus according to claim 11, wherein said multi-faceted media includes elongated uniform projections.

14. The pollution treatment apparatus according to claim 10, wherein said multi-faceted media includes through openings.

15. The pollution treatment apparatus according to claim 14, wherein said multi-faceted media includes a central body having a roughened surface.

16. The pollution treatment apparatus according to claim 10, wherein the three baskets are interconnected together.

17. The pollution treatment apparatus according to claim 16, wherein a cantilevered bumper is pivotally mounted on one of the three baskets.

18. The pollution treatment apparatus according to claim 17, wherein a plurality of said cantilevered bumpers surrounds said one basket.

* * * * *